United States Patent
Mane

(10) Patent No.: US 7,688,858 B2
(45) Date of Patent: Mar. 30, 2010

(54) METHOD AND SYSTEM FOR PRE-FETCHING NETWORK DATA USING A PRE-FETCHING CONTROL PROTOCOL

(75) Inventor: Pravin D. Mane, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1334 days.

(21) Appl. No.: 11/114,272

(22) Filed: Apr. 25, 2005

(65) Prior Publication Data

US 2005/0232152 A1   Oct. 20, 2005

Related U.S. Application Data

(63) Continuation-in-part of application No. 10/746,788, filed on Dec. 23, 2003, now abandoned.

(51) Int. Cl.
*H04J 3/24* (2006.01)
(52) U.S. Cl. .................................. 370/473; 370/389
(58) Field of Classification Search ............... 370/389, 370/400–402, 216, 235, 231, 395.52, 469, 370/474, 392, 229, 232, 351, 473, 221, 217
See application file for complete search history.

(56) References Cited

U.S. PATENT DOCUMENTS

| | | | |
|---|---|---|---|
| 5,063,562 A | 11/1991 | Barzilai et al. | |
| 5,193,151 A | 3/1993 | Jain | |
| 5,392,286 A | 2/1995 | Tanaka et al. | |
| 6,208,620 B1 * | 3/2001 | Sen et al. | 370/231 |
| 6,208,653 B1 * | 3/2001 | Ogawa et al. | 370/395.52 |
| 6,219,713 B1 | 4/2001 | Ruutu et al. | |
| 6,345,301 B1 | 2/2002 | Burns et al. | |
| 6,490,251 B2 * | 12/2002 | Yin et al. | 370/236.1 |
| 7,346,077 B2 * | 3/2008 | Tourunen et al. | 370/469 |
| 2001/0046210 A1 | 11/2001 | West et al. | |
| 2002/0071388 A1 | 6/2002 | Bergsson et al. | |
| 2002/0150041 A1 | 10/2002 | Reinshmidt et al. | |
| 2003/0198183 A1 | 10/2003 | Henriques et al. | |
| 2005/0068894 A1 | 3/2005 | Yu et al. | |
| 2005/0074002 A1 * | 4/2005 | Yoakum et al. | 370/389 |
| 2005/0240668 A1 | 10/2005 | Rolia et al. | |
| 2007/0025255 A1 | 2/2007 | Noble | |

OTHER PUBLICATIONS

Office Action for U.S. Appl. No. 10/746,788 mailed Jun. 27, 2007, 13 pgs.
Bakre, Ajay, et al., "Handoff and System Support for Indirect TCP/IP", In Proceedings for Second Usenix Symposium On Mobile and Loacation-Independent Computing, 14 pgs.

(Continued)

*Primary Examiner*—Brenda Pham
(74) *Attorney, Agent, or Firm*—Blakely, Sokoloff, Taylor & Zafman LLP

(57) ABSTRACT

A method and system for pre-fetching network data using a pre-fetching control protocol is described. The method includes dividing a data transmission into a first data set and a second data set at a source, transmitting the first data set to a destination and the second data set to an intermediate location, and transmitting the second data set to the destination from the intermediate location.

19 Claims, 5 Drawing Sheets

OTHER PUBLICATIONS

Bakre, Ajay, et al., "I-TCP: Indirect TCP for Mobile Hosts", Technical Report DCS-TR-314, Rutgers University, Oct. 1994, pp. 1-18.

Balakrishnan, Hari, et al., "Improving TCP/IP Performance over Wireless Networks", In proceedings of the 1st ACM Int'l Conference on Mobile Computing and Networking (Mobicom), Nov. 1995, 10 pgs.

Desimone, Antonio, et al., "Throughput Performance of Transport-Layer Protocols over Wireless LANs", In Proceedings for Globecom'93, Dec. 1993, pp. 542-549.

Marina, Mahesh K., et al., "On-demand Multipath Distance Vector Routing in Ad Hoc Networks", Department of Electical & Computer Engineering and Computer Science, University of Cincinnati, 2002, 10 pgs.

Perkins, Charles E., et al., "Ad hoc On-Demand Distance Vector (AODV) Routing", IETF Internet, Jul. 2003, 33 pgs.

Perkins, Charles E., et al., "Highly Dynamic Destination-Sequenced Distance-Vector Routing (DSDV) for Mobile Computers", *In Proceedings of the ACM SIGCOMM*, 1994, pp. 234-244.

Vutukury, Srinivas, et al., "MDVA: A Distance-Vector Multipath Routing Protocol", *In Proceedings of the IEEE INFOCOM*, 2001 pp. 557-564.

Yavatkar, Raj, "Improving End-to-End Performance of TCP over Mobile Internetworks", *In Mobile 94 Workshop on Mobile Computing and Systems and Applications*, Dec. 1994, pp. 146-152.

\* cited by examiner

METHOD AND SYSTEM FOR PRE-FETCHING NETWORK DATA USING A PRE-FETCHING CONTROL PROTOCOL

CROSS REFERENCE TO RELATED APPLICATION

This application is a Continuation-In-Part of U.S. patent application Ser. No. 10/746,788 filed Dec. 23, 2003 now abandoned.

TECHNICAL FIELD

Embodiments of the invention relate to the field of network data processing, and more specifically to a system and method for pre-fetching network data using a pre-fetching control protocol.

BACKGROUND

Real-time network applications, such as streaming media applications, are not tolerant of transmission delays. For these real-time applications, data packets need to be delivered when they are needed by the receiving node. In the case of a streaming video or audio transmission, for example, late-arriving data will cause the end-user at the receiving node to experience choppy video or audio feed, or jittery frames on the screen. Late arriving data is discarded at the receiving node because it is useless to display an out-of-sequence data frame or segment in such real-time applications.

The predominant transport level protocol used on the Internet for high reliability data transmission is the Transmission Control Protocol (TCP). TCP was developed for traditional networks made of wired links and stationary network nodes. In wired networks, bit error rates are relatively low, so packet delays and losses are assumed to be due to congestion. Congestion is a condition of severe delay caused by an overload of data at one or more data switching points in a network (e.g., at routers). TCP includes both a data recovery mechanism that retransmits lost data, and a congestion control mechanism that reduces transmission bandwidth before retransmitting the lost packets.

TCP uses a sliding window protocol to manage the transmission and reception of data packets between a sending node (sender) and receiving node (receiver). FIG. 1A shows a sequence of data packets 1 through n awaiting transmission. The protocol places a window at the beginning of the sequence and all of the data packets in the window are transmitted in order. In the example shown in FIG. 1A, the window is 8 data packets long, so data packets 1 through 8 are transmitted sequentially. When the sender receives an acknowledgement from the receiver for data packet 1, the protocol slides the window to the right and sends the next packet, packet 9, as shown in FIG. 1B. The window continues to move to the right as subsequent acknowledgements are received, as shown in FIG. 1C.

Thus, at any point in time, data packets may be characterized as 1) data packets to the left of the window that have been sent and acknowledged, 2) data packets within the widow that have been sent and not acknowledged, or ready to send without delay, and 3) packets to the right of the window that cannot be sent until the window moves. The maximum number of sent and unacknowledged data packets is limited to the size of the window. As a result, the transmission of packets to the right of the window is delayed.

At the receiver node, data packets are processed sequentially through another sliding window that segregates data into packets that 1) have been correctly received and acknowledged, and 2) packets that have been received but not verified and/or acknowledged. If a packet is lost or delayed, the packet is recovered in one of two ways: 1) the receiver can request retransmission of the packet by sending, to the original sending node, the sequence number of the last sequential data packet received at the receiving node node, or 2) the sender can retransmit the packet if an acknowledgement is not received from the receiving node within a certain amount of time. Both of these mechanisms introduce additional delays in completing the reception of some packets (i.e., lost packets as well as packets that have not yet been sent by the source).

In addition to the data recovery process discussed above, TCP also reduces the size of the data window when data packets are lost or delayed, further reducing the bandwidth and throughput of the connection between the sending node and the receiving node.

A conventional approach used in TCP networks to improve data reliability uses caching servers in the data path to cache data close to the receiver (e.g., within a limited number of network hops). However, this approach requires dedicated, expensive caching servers at strategic locations throughout a network. Furthermore, the caching servers may increase data delay.

As noted above, TCP was developed to address the requirements of wired networks with fixed nodes. When applied to wireless networks with mobile nodes, TCP can have negative effects. Unlike wired networks, wireless networks are characterized by relatively high bit error rates and occasional signal loss, rather than network congestion. When TCP is applied to a wireless network, the reduction of transmission bandwidth by TCP in reaction to packet losses, based on a network congestion model, may result in poor bandwidth utilization, poor throughput, longer delays and poor overall performance in real-time data-streaming applications.

Conventional approaches to the problem of TCP on wireless networks include: 1) Indirect-TCP protocol which segregates the connection between a wired host and a wireless host into a wired network connection and a one-hop wireless connection which uses a wireless link specific protocol, 2) a wireless link level retransmission protocol coupled with forward error correction (FEC) at the data link level, and 3) the "Snoop Protocol" which caches packets at the wired/wireless interface and performs local retransmissions across wireless links by monitoring data packet acknowledgements by the receiver.

All of the above approaches, both wired and wireless, are based on the TCP data reliability model for network communications, rather than a delay-centric model that has greater utility for real-time multimedia applications.

BRIEF DESCRIPTION OF THE DRAWINGS

The invention may best be understood by referring to the following description and accompanying drawings that are used to illustrate embodiments of the invention. In the drawings.

DETAILED DESCRIPTION

Embodiments of a system and method for pre-fetching network data using a pre-fetching control protocol (PCP) are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
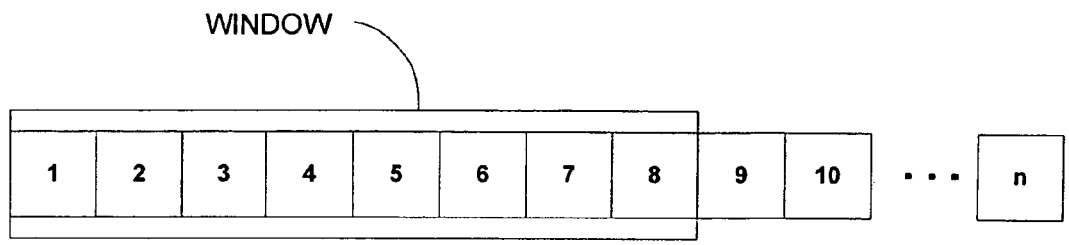
FIG. 1 illustrates a conventional TCP transmission window.
Figure 1B:
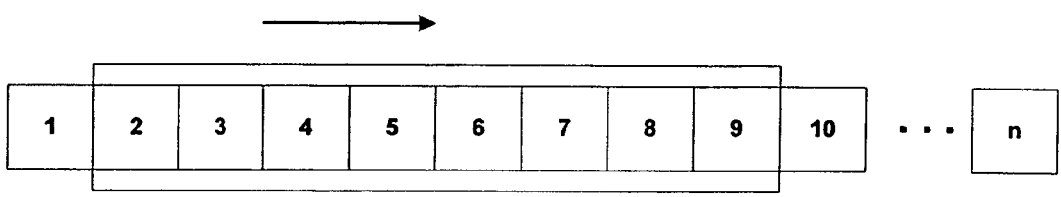
Figure 1C:
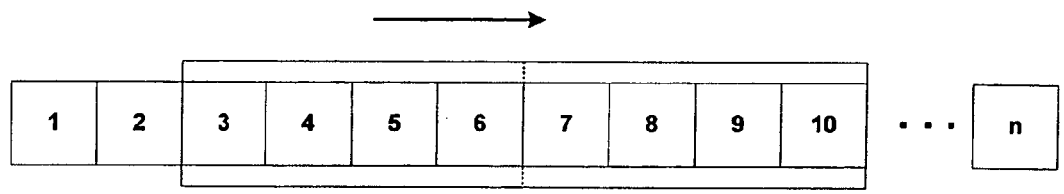
Figure 2:
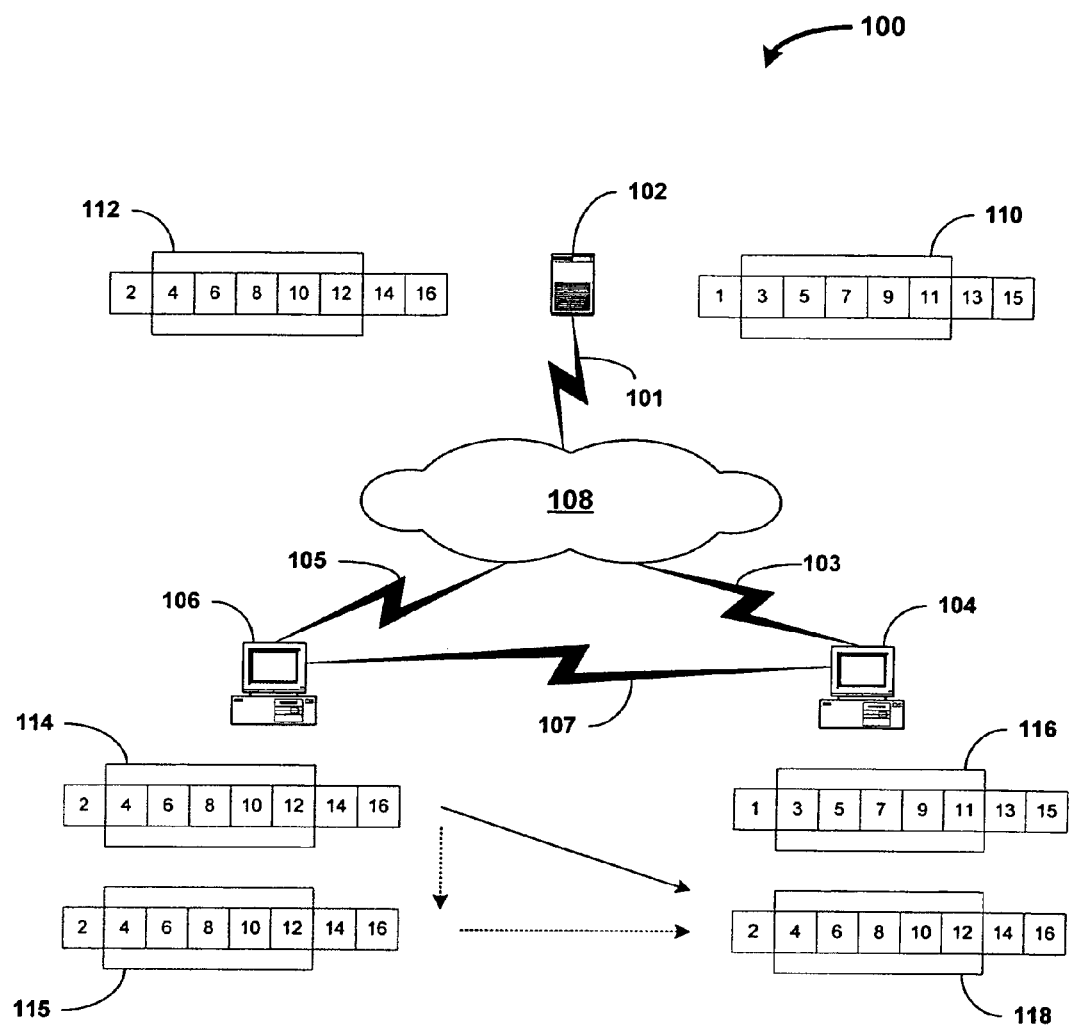
FIG. 2 illustrates one embodiment of pre-fetching network data using a pre-fetching control protocol.

In one embodiment, as illustrated in FIG. 2, a network 100 includes a sender node 102, a receiver node 104 and a helper node 106 interconnected through network 108. Each of sender node 102, receiver node 104 and helper node 106 may be any type of network terminal device such as, for example, a desktop computer, a laptop computer, a network server, a personal digital assistant or the like. Additionally, helper node 106 may be a wired or wireless network access point, switch or router, or the like. Network 108 may be any TCP/UDP compatible packet-switched network such as, for example, a local area network (LAN), wide area network (WAN), an intranet, or the Internet. Sender node 102, receiver node 104 and helper node 106 may be linked to network 108 via communication links 101, 103 and 105 respectively, which may be either wired or wireless communication links. In one embodiment, helper node 106 may be directly connected to receiver node 104 by a wired or wireless communication link, such as communication link 107. In alternative embodiments, helper node 106 may be connected to receiver node 104 through one or more intermediate nodes. In one embodiment, one or more of communications links 101, 103, 105 and 107 may be IEEE Standard 802.11x compatible communication links or other types of wireless links (e.g., GSM or CDMA). Network 108 may contain many intermediate nodes and links which may include wired or wireless links connecting nodes, routers, switches, access points and the like. Network 108 may provide data communication pathways among sender node 102, receiver node 104 and helper node 106 via communication links 101, 103 and 105.

In one embodiment of a pre-fetch control protocol (PCP), when a PCP configured sender node 102 initiates a data transmission to receiver node 104, sender node 102 may locate receiver node 104 using TCP compliant procedures to establish a packet-switched data path to receiver node 104 through network 108 and to determine if receiver node 104 is configured for PCP. Sender node 102 may then transmit a query to receiver node 104 to determine if receiver node 104 has established a connection with a PCP compatible helper node, such as helper node 106, and whether a data path exists from the sender node 102 to the helper node 106. In one embodiment, such a connection may have been established during a prior PCP-based communication session between receiver node 104 and helper node 106. Alternatively, the relationships between sender node 102, receiver node 104 and helper node 106 may be pre-configured via local or remote configuration tools.

Absent a pre-configured relationship among sender node 102, receiver node 104 and helper node 106, as described above, receiver node 104 may search for a helper node either on the path to receiver node 104, or on an alternate path to receiver node 104 to facilitate load balancing as described below. In general, a helper node, such as helper node 106, may be any network node that 1) is located within a specified number of network hops (e.g., one or two) from the receiver node, such that data may be transmitted from helper node 106 to receiver node 104 with a delay that is less than a specified maximum delay, and 2) which has resources available to support helper functionality as described below. Selection of the helper node is described in greater detail below. PCP may use techniques similar to the ad-hoc on-demand multipath distance vector (AOMDV) protocol that provides the receiver node 104 with alternate routes to the sender node 102 and supports the location of a network node that will act as a helper node, such as helper node 106. PCP may modify AOMDV to account for power requirements and power availability at the nodes when the receiver node 104 initiates the route discovery process and solicits alternate routes to the sender node 102.

Helper node 106 may be any type of computing device connected to the network. In the case of a wireless network, helper node may be a wireless access point or a mobile device such as a laptop computer or PDA. The selection of the helper node, to help the receiver node by pre-fetching data from the sender node, may be based on a number of factors. Such factors may include: 1) the relative position of the helper node in the path from the sender node to the receiver node, 2) the power requirements and power availability at the helper node, 3) the size and availability of a data buffer at the helper node, and 4) the level of security and data privacy provided by the helper node.

Once a helper node, such as helper node 106, has been identified, the helper node 106 and the receiver node 104 may exchange security credentials and transport level authentication parameters, as well as quality of service (QoS) agreements. Such authentication and QoS processes are known in the art and will not be discussed in detail. Similarly, the sender node 102 and the receiver node 104 may exchange security credentials and transport level authentication parameters, as well as quality of service (QoS) agreements. Additionally, receiver node 104 may notify sender node 102 of the availability of a helper node, such as helper node 106, and authorize the use of PCP as the transport layer mechanism between sender node 102 and receiver node 104. Sender node 102, receiver node 104 and helper node 106 may then initialize their respective communications resources in preparation for data transfer.

In one embodiment, with reference to FIG. 2, data to be transmitted from the sender node 102 to the receiver node 104 may be divided into a number of data packets, which may be TCP compatible data packets or any other type of data packet recognized by the network nodes in any routes between the sender node 102, the receiver node 104 and the helper node 106. Using a first sliding window 110 at the sender node 102, a portion of the data packets scheduled for transmission to the receiver node 104 (e.g., odd-numbered data packets 1, 3, 5, etc.) may be transmitted directly from the sender node 102 to the receiver node 104. The remaining data packets scheduled for transmission to the receiver node 104 (e.g., even-numbered data packets 2, 4, 6 etc.) may be transmitted from the sender node 102 to the helper node 106 using a second sliding window 112. At the helper node 106, in one embodiment, a single sliding window 114 may be used to receive the data packets from the sender node 102, and subsequently to retransmit the data packets to the receiver node 104. In another embodiment, data packets received at helper node 106 through sliding window 114 may be passed to a second sliding window 115 and retransmitted to receiver node 104 through the second sliding window 115 at the helper node. At the receiver node 104, a first sliding window 116 may be used to receive data from sender node 102 and a second sliding window 118 may be used to receive data from helper node 106. The packets of the data transmission received from the sender node 102 and the helper node 106 may then be assembled in order at the receiver node 104.

In other embodiments, data from the sender node 102, scheduled for the receiver node 104, may be divided between the receiver node 104 and the helper node 106 using a variety of algorithms. For example, data scheduled for the receiver node 104 and data scheduled for the helper node may be queued in separate data stacks or transmit buffers as are known in the art. In one embodiment, the data may be divided between the helper node 106 and the receiver node 104 based on data type. For example, in a streaming multimedia data transmission, primary data packets may be sent to the receiver node 104 and forward error correction (FEC) packets may be sent to the helper node 106, where they may be retrieved as needed by the receiver node 104, without network delay, to correct transmission errors.

Once a data division algorithm is selected, data earmarked for the receiver node 104 may be transmitted from the sender node 102 to receiver node 104 through sliding window 110 and the data earmarked for the helper node 106 may be transmitted from the sender node 102 through sliding window 112. At the receiver node 104, the protocol may use two sliding windows 116 and 118 to receive data packets. Sliding window 116 may be used to receive packets from the source node 102, while sliding window 118 may be used to receive packets from the helper node 106. Data flow between the helper node 106 and receiver node 104 may be controlled in a manner analogous to TCP as described above. For example, helper node 106 and receiver node 104 may use TCP acknowledgement and retransmission protocols. However, because helper node 106 may be chosen for its proximity to receiver node 104, the delays associated with TCP may be avoided.

In one embodiment, the PCP protocol may use two sliding windows at helper node 106. One sliding window 114 may be used to receive packets at the helper node 106 from the sender node 102, and another sliding window 115 may be used to transmit packets from the helper node 106 to the receiver node 104. In an alternative embodiment, the protocol may use one sliding window 114 at helper node 106 to receive packets from the sender node 102 and to transmit packets from the helper node 106 to the receiver node 104. In this embodiment, when the sliding window 114 is filled by data received from the sender node 102, the helper node 106 may stop accepting data from the sender node 102 until some of the data has been transmitted to the destination node 104. As noted above, the implementation of a direct path from the sender node 102 to the receiver node 104 and an indirect path from the sender node 102 to the receiver node 104, through a helper node 106, may provide a mechanism for load balancing. That is, rather than delaying the transmission of data over a single network connection in response to data losses, data that would otherwise be delayed may be transmitted over an alternate route to a helper node 106 in proximity (e.g., within a specified number of network hops) to the to the receiver node 104, where the data may be readily accessed without delay by the receiver node 104.

In one embodiment, PCP may also be used to handle network data that normally uses user datagram protocol (UDP) as a transport mechanism. For UDP traffic, PCP may push data from the sender node 102 to the receiver node 104 and the helper node 106 without data verification by the sender node 102. The responsibility for data reliability may be handled by a quality of service (QoS) agreement between the helper node 106 and the receiver node 104, with application level verification at the receiver node.

Figure 3:
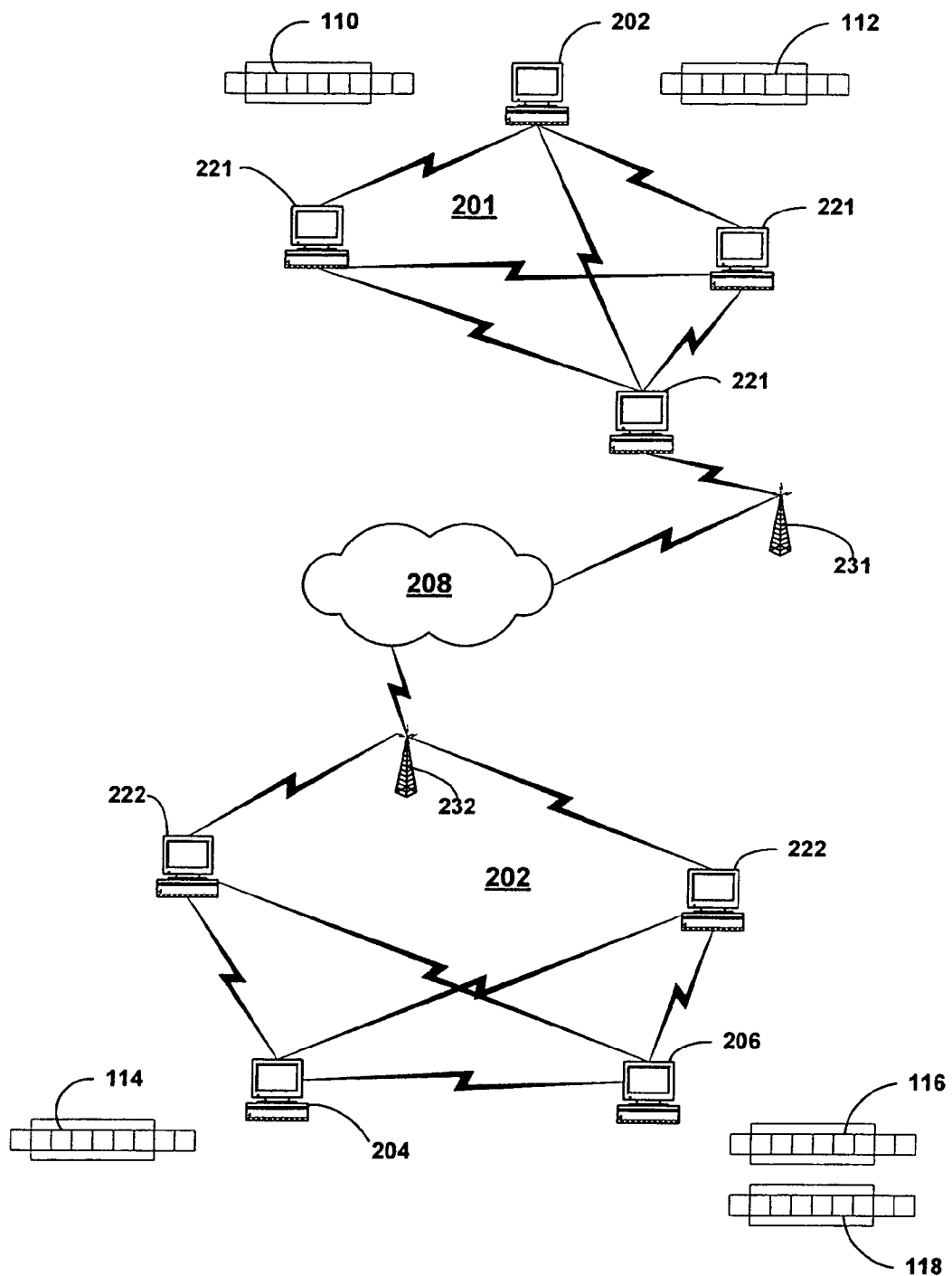
FIG. 3 illustrates another embodiment of pre-fetching network data using a pre-fetching control protocol.

As illustrated in FIG. 3, the PCP protocol may be implemented in linked mesh networks, such as mesh networks 201 and 202, with wireless access to a wide area network (WAN), such as Internet 208. A mesh network may be defined as a network where every node is directly connected to every other node in the network. The PCP protocol may also be implemented in partially meshed or non-meshed networks (e.g., ring networks or star networks). In FIG. 3, a first mesh network 201 includes a sender node 202, a plurality of mesh nodes 221 and a wireless access point 231. A second mesh network 202 may include a wireless access point such as wireless access point 232 and a plurality of mesh nodes 222 providing a path to a helper node 206 and a path to a receiver node 204. In FIG. 3, the operation of sliding windows 110, 112, 114, 116 and 118 may conform to the window operations as described above. Sender-to-receiver data and sender-to-helper data may be segregated on the branches of mesh network 201 and 202 such that no node is required to manage both receiver node data and helper node data.

Figure 4:
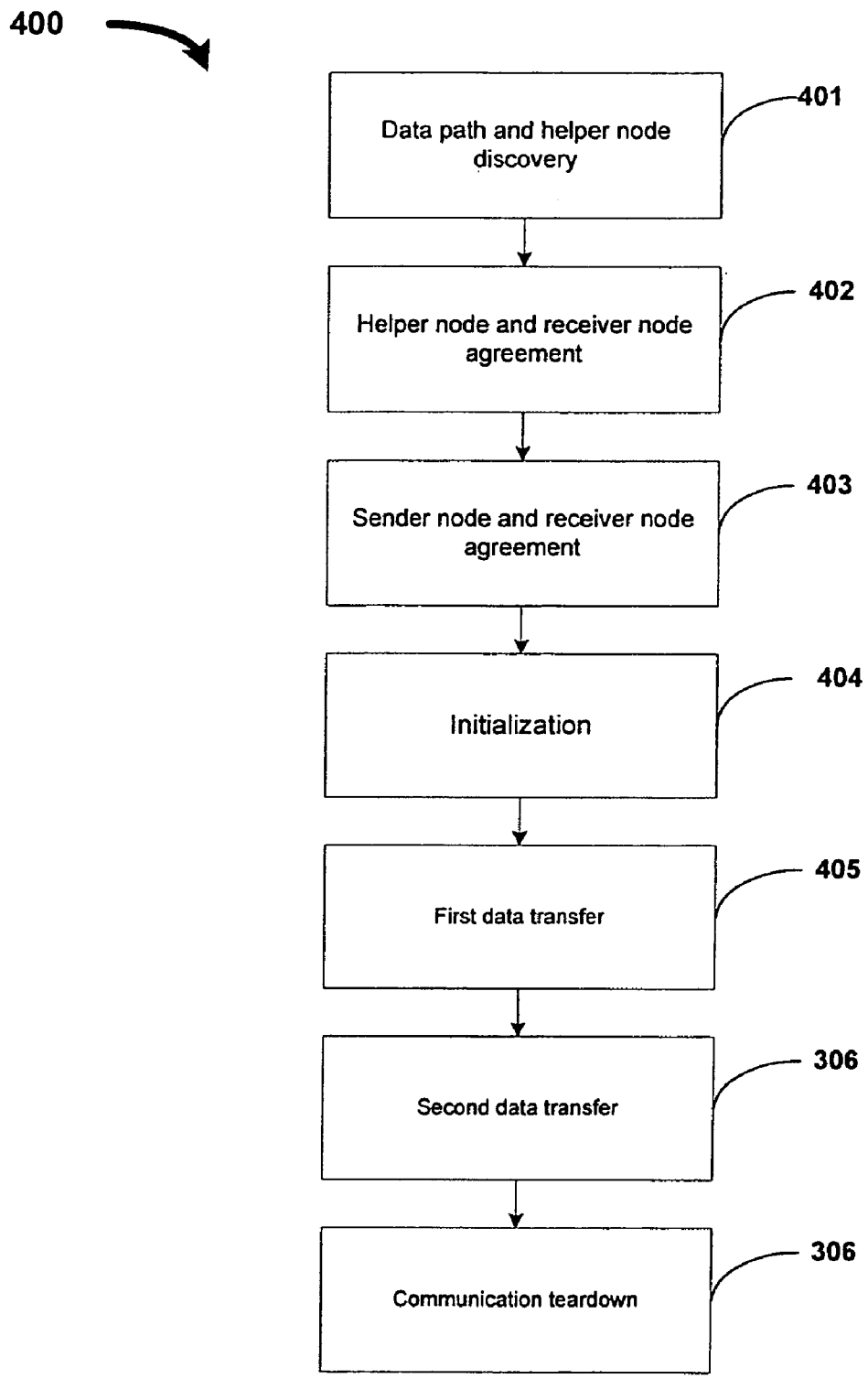
FIG. 4 is a flow diagram illustrating one embodiment of pre-fetching network data using a pre-fetching control protocol.

A technique for PCP communication may be described in terms of phases; FIG. 4 illustrates one embodiment 400 of PCP phases. Other embodiments may include fewer phases, more phases or a different order of phases. In a path and helper node discovery phase (401), a sender node 102 discovers a path from the sender node 102 to a receiver node 104 in a network 108 and determines if the receiver node 104 has an established connection with a helper node 106 in the network 108 and if a data path exists from the sender node 102 to the helper node 106.

In a helper and receiver agreement phase (402), the receiver node 104 and the helper node 106 agree on a transport level authentication between the receiver node 104 and the helper node 106, exchange security credentials and agree on quality of service.

In a sender and receiver agreement phase (403), the sender node 102 and the receiver node 104 agree on a transport level authentication between the sender 102 node and the receiver node 104, exchange security credentials and agree on quality of service. This phase may be optional depending on the level of security required for the connection between the sender node and the receiver node. In this phase, the receiver node may instruct the sender node to use PCP as the transport layer mechanism and notify the sender node of the helper node.

In an initialization phase (404), the sender node 102, the receiver node 104 and the helper node 106 initialize their respective data windows (e.g., 110, 112, 114, 116, 118 and optionally 115) before data transmission begins.

In a first data transfer phase (405), the sender node 102 divides the data transmission into a first group of data packets, which is transmitted from the sender node 102 to the receiver node 104 from a first data transmission window 110 at the sender node 102, and a second group of data packets that are transmitted from the sender node 102 to the helper node 106 from a second data transmission window 112 at the sender node 102. The helper node 106 receives the second group of data packets from the sender node 102 in a first data reception window 114 at the helper node 106, and the receiver node 104 receives the first group of data packets from the sender node 102 in a first data reception window 116 at the receiver node 104.

In a second data transfer phase (406), the receiver node 104 requests data from the helper node 106 as needed to replace lost data and/or correct data errors. The helper node 106 transmits data to the receiver node from the first data reception window 114 at the helper node 106, and the receiver node 104 receives the data in a second data reception window 118 at the receiver node 104. The receiver node 104 may then repair or replace data packets received in reception windows 116 and/or 118 and reassemble the data transmission.

In a communication teardown phase (407), a teardown may be initiated by the sender node 102 when it has finished sending data, or by the receiver node 104 when it has finished receiving data. In either case, the sender node 102, the receiver node 104 and the helper node 106 may exchange control messages such as are known in the art to facilitate the connection teardown.

Figure 5:
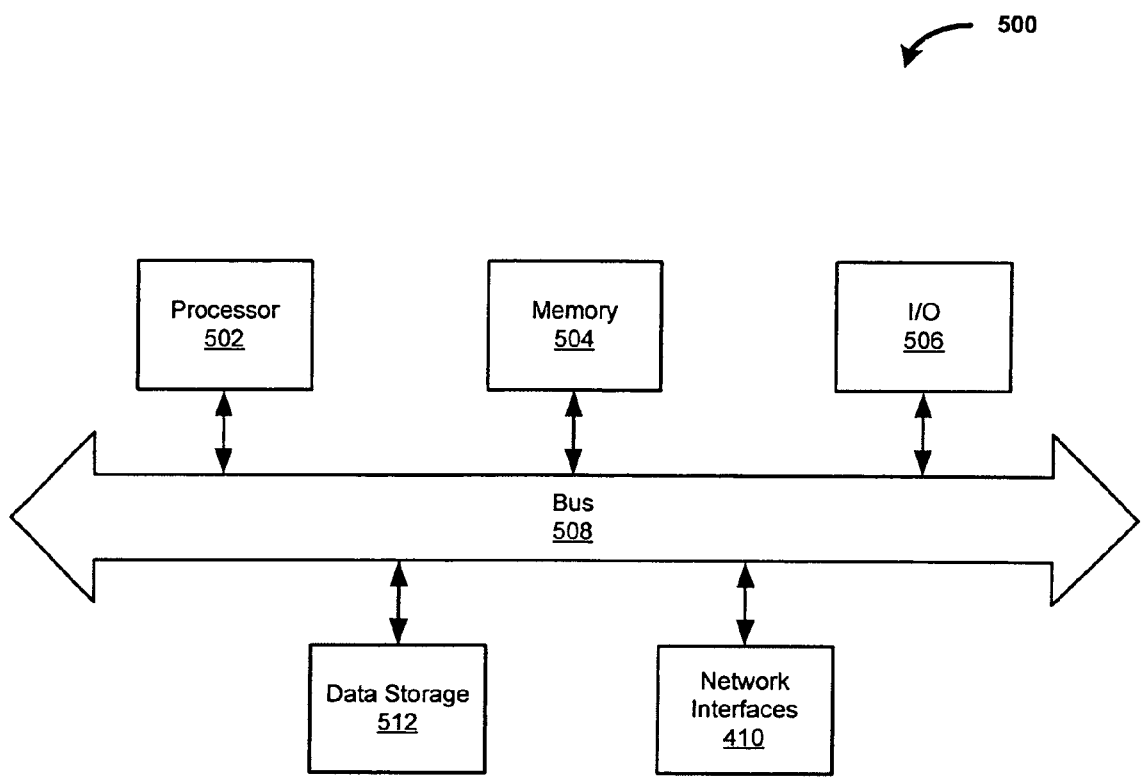
FIG. 5 illustrates a system in one embodiment of the invention.

FIG. 5 is a block diagram illustrating a suitable computing environment 500 in which certain aspects of the communication techniques described herein may be practiced. In one embodiment, the method described above may be implemented on a computer system 400 having components 502-512, including a processor 502, a memory 504, an input/output device 506, a data storage device 512, and a network interface 510, coupled to each other via a bus 508. The components perform their conventional functions known in the art and provide the functionality for implementing the system 100. Collectively, these components represent a broad category of hardware systems, including but not limited to general-purpose computer systems and specialized packet forwarding devices. It is to be appreciated that various components of computer system 500 may be rearranged, and that certain implementations of the present invention may not require nor include all of the above components. Furthermore, additional components may be included in system 500, such as additional processors (e.g., a digital signal processor), storage devices, memories, and network or communication interfaces.

The content for implementing communication techniques described herein (e.g., computer program instructions) may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in any manner known in the art.

The content for implementing an embodiment of the method of the invention may also be provided to the system 100 from any external device capable of storing the content and communicating the content to the system 100. For example, the system 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method, comprising:
   transmitting a first group of data packets from a source device to a destination device according to a first data transmission window and a second group of data packets from the source device to an intermediate device according to a second data transmission window, wherein the first group of data packets and the second group of data packets together provide a stream of data destined for the destination device, wherein the intermediate device is selected based on one or more of: a relative position of the intermediate device in a path from the source device to the destination device, power requirements and power availability at the intermediate device, size and availability of a data buffer at the intermediate device, and a level of security and data privacy provided by the intermediate device;
   receiving the first group of data packets with the destination device according to a first data reception window;
   receiving the second group of data packets with the intermediate device according to a second data reception window;
   transmitting the second group of data packets from the intermediate device to the destination device;
   receiving the second group of data packets with the destination device according to a third data reception window;
   finding a path from the source device to the destination device, a path from the source device to the intermediate device, and a path from the intermediate device to the destination device;
   dividing data at the source device into the first group of data packets and the second group of data packets; and
   ordering and assembling the first group of data packets and the second group of data packets.

2. The method of claim 1, wherein transmitting the second group of data packets from the intermediate device to the destination device comprises transmitting the second group of data packets according to the second data reception window.

3. The method of claim 1, wherein transmitting the second group of data packets from the intermediate device to the destination device comprises:
   transferring the second group of data packets from the second data reception window to a third data transmission window; and
   transmitting the second group of data packets from the third data transmission window to the third data reception window.

4. The method of claim 1, wherein the path from the source device to the intermediate device does not intersect the path from the source device to the destination device.

5. The method of claim 1, wherein the first group of data packets and the second group of data packets comprise alternate data packets in a sequential data stream.

6. The method of claim 1, wherein the first group of data packets comprises primary data packets and the second group of data packets comprises error correction data packets.

7. The method of claim 6, wherein the destination device receives the second group of data packets when the second group of data packets is needed to correct the first group of data packets.

8. The method of claim 1, wherein the second group of data packets duplicates the first group of data packets.

9. The method of claim 8, wherein the destination device receives the second group of data packets when the second group of data packets is needed to replace the first group of data packets.

10. An article of manufacture comprising:
a computer-readable storage medium encoded thereon computer-executable instructions that being executed by a computer cause the computer to perform operations comprising:
transmitting a first group of data packets from a source device to a destination device according to a first data transmission window and a second group of data packets from the source device to an intermediate device according to a second data transmission window, wherein the first group of data packets and the second group of data packets together provide a stream of data destined for the destination device, wherein the intermediate device is selected based on one or more of: a relative position of the intermediate device in a path from the source device to the destination device, power requirements and power availability at the intermediate device, size and availability of a data buffer at the intermediate device, and a level of security and data privacy provided by the intermediate device;
receiving the first group of data packets with the destination device according to a first data reception window;
receiving the second group of data packets with the intermediate device according to a second data reception window;
transmitting the second group of data packets from the intermediate device to the destination device;
receiving the second group of data packets with the destination device according to a third data reception window;
finding a path from the source device to the destination device, a path from the source device to the intermediate device, and a path from the intermediate device to the destination device;
dividing data at the source device into the first group of data packets and the second group of data packets; and
ordering and assembling the first group of data packets and the second group of data packets.

11. An article of manufacture of claim 10, wherein transmitting the second group of data packets from the intermediate device to the destination device comprises transmitting the second group of data packets according to the second data reception window.

12. The article of manufacture of claim 10, wherein transmitting the second group of data packets from the intermediate device to the destination device comprises: transferring the second group of data packets from the second data reception window to a third data transmission window; and transmitting the second group of data packets from the third data transmission window to the third data reception window.

13. The article of manufacture of claim 10, wherein the machine accessible medium further includes content that causes the machine to perform operations further comprising: dividing data at the source device into the first group of data packets and the second group of data packets; and ordering and assembling the first group of data packets and the second group of data packets.

14. The article of manufacture of claim 13, wherein the path from the source device to the intermediate device does not intersect the path from the source device to the destination device.

15. The article of manufacture of claim 10, wherein the first group of data packets and the second group of data packets comprise alternate data packets in a sequential data stream.

16. The article of manufacture of claim 10, wherein the first group of data packets comprises primary data packets and the second group of data packets comprises error correction data packets.

17. The article of manufacture of claim 16, wherein the destination device receives the second group of data packets when the second group of data packets is needed to correct the first group of data packets.

18. The article of manufacture of claim 10, wherein the second group of data packets duplicates the first group of data packets.

19. The article of manufacture of claim 18, wherein the destination device receives the second group of data packets when the second group of data packets is needed to replace the first group of data packets.

* * * * *